Nov. 7, 1933.    O. W. HAHN    1,933,852
FLUID FLOW CONTROL DEVICE
Filed Jan. 2, 1929
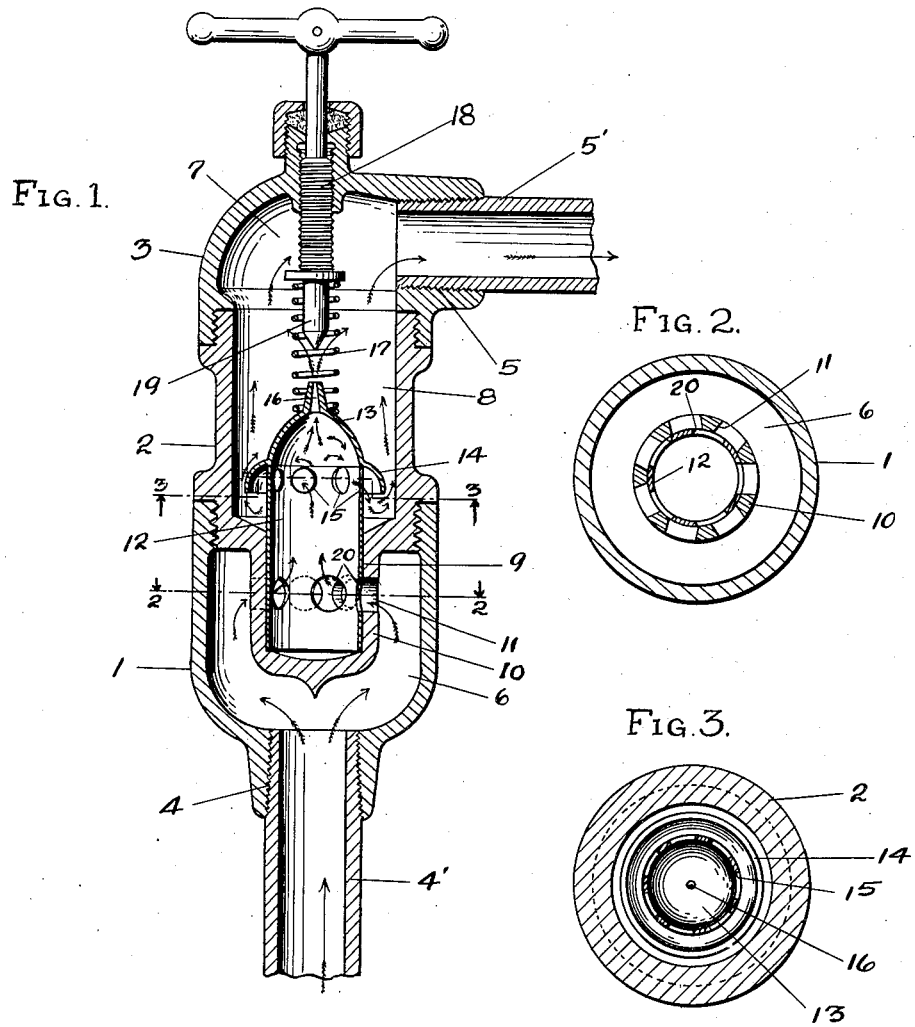
INVENTOR.
OTTO W. HAHN.
BY *Miller Boykin & Fried*
ATTORNEYS.

Patented Nov. 7, 1933

1,933,852

UNITED STATES PATENT OFFICE 1,933,852

FLUID FLOW CONTROL DEVICE

Otto W. Hahn, San Francisco, Calif.

Application January 2, 1929. Serial No. 329,830

4 Claims. (Cl. 137—152)

This invention relates to means for controlling the volume or flow of a fluid through a pipe, and the objects of the invention are to provide a simple, cheap, device, easily connected into a pipe line to form part of the line, and which will control the flow of a fluid through the pipe so that it is substantially constant over a wide range of delivery pressures, and/or a wide range of discharge heads or back pressures.

Briefly described, my invention comprises a valved device located in a pipe or water or other fluid passage, and which device contains an element responsive to the dynamic pressure of the water in a manner to vary the valve opening inversely in relation to the dynamic pressure, so as to maintain a constant discharge. Thus with the device set for a discharge of, say three gallons per minute, the kinetic energy of a flow to produce this will open the valve just sufficient for the flow, so that if the pressure should rise to increase the dynamic pressure the valve will close to reduce it and vice versa. This is unlike an automatic pressure reducing regulator which controls the pressure at a constant lower value at the discharge side of the valve, inasmuch as the present invention permits the static pressure to freely equalize itself on both sides of the valve, and which is directly contrary to the functioning of a pressure regulator.

The principle mentioned above, of using the dynamic pressure of the liquid to control the discharge thereof per minute, I have found to be capable of being carried out in a variety of specific constructions, and in the drawing accompanying this application I show a simple form of device which utilizes the principle and is very reliable in its action.

In the drawing Fig. 1 is a longitudinal section of my device showing all the inner parts.

Fig. 2 is a cross section of the device of Fig. 1 taken along the line 2—2 thereof.

Fig. 3 is a cross section of the device of Fig. 1 taken along the line 3—3 thereof.

The body of the device comprises three hollow sections 1, 2, 3, screwed together in the manner shown so as to form a complete cylindrical body provided at one end with a threaded opening 4 adapted to be screwed to an inlet pipe 4', and at the opposite end a threaded opening 5 adapted to be screwed to an outlet or discharge pipe 5'.

The interior of section 1 of the body is a simple chamber 6, as is also the interior of section 3, a simple chamber 7. The interior of section 2 is a cylindrical chamber 8 provided with a reduced size cylindrical chamber 9 extending downwardly from one end thereof into the chamber 6 and separated therefrom by a wall 10, chamber 9 being closed at the bottom.

Wall 10 of extension chamber 9 is provided with a series of inlet apertures 11, and within the chamber 9 is slidably positioned a tubular shell 12 open at its lower end and apertured adjacent this end with a series of inlet holes 20, and provided at its upper end with a conically formed cap 13 having a rim 14 which overhangs the tubular body 12 and extends downwardly and outwardly into the chamber 8, while just beneath the cap 13 is a row of discharge openings 15 formed in the side wall of the tubular member 12, and extending through the central apex of the cap is a small orifice 16.

The device as described would be complete if it were to be used in a vertical position, but in order to permit the device to be used in horizontal or any other position I provide a light compression spring 17 bearing on top of the cap 13 so as to insure the tubular device 12 tending to remain pushed into the chamber 9, and the tension of this light spring is controlled by a screw 18 extending through the wall of section 3 for convenience of manipulation from the outside, while the inner end of the screw is reduced and extends into the spring as shown at 19 so as to form a stop against undue longitudinal movement of the tubular device 12.

In a device of this character for a given size of pipe, it is contemplated that the area of the inlet holes 11 and 20, and the area of the outlet holes 15 taken with the area of the small hole 16, also the area of the annular passage between the edge of cap 14 and the inner wall of chamber 8, shall each be equal to the area of the inlet pipe screwed to the device at 4, and also equal to the area of the outlet pipe screwed to the device at 5, so that with the tubular member 12 at the bottom of chamber 9 there will be a fluid passage from the inlet at 4 to the outlet at 5 of substantially equal area at all points so that a fluid would flow through the pipe in which the device was installed with substantially the same freedom that it would flow through the pipe without the device in place.

Since the tubular member 12 is prefectly free to rotate in the cylindrical bore 9 it is manifest that if the inlet holes in the member 12 and in the wall of the chamber 10 were evenly disposed upon slight revolution of the member 12 there would be a considerable reduction in the respective area of the port for the inlet of the liquid, and in order to overcome this without splining or otherwise preventing the rotation of member 12, I simply provide a set of holes in member 12 and a set of holes in wall 10 of unequal numbers, so that any point of relative rotation of the member 12 and wall 10 there will always be a free passage for entry of the fluid to the member 12 substantially equal to the area of the inlet pipe 4'. This unequal disposition of the holes in the two members as described is best shown in the sectional Fig. 2.

In considering the device as described and with the tubular or sleeve member 12 at the bottom of chamber 9 as shown, it will be seen that a fluid, such as water, entering from the pipe 4' will freely flow upward, pass through the inlet holes 11 and 20 to the interior of member 12, thence upward and outward through outlet holes 15 to chamber 7, while a small quantity of the liquid will pass directly through the small orifice 16 to join the liquid in chamber 7 and thence pass freely out of the pipe 5'. It will also be observed that since the portion of fluid passing through restricted orifice 16 will develop a friction tending to lift member 12, and that the kinetic energy of the flowing water in passing outwardly through passages 15 and through reversal of the direction of flow of the liquid caused by overhanging rim 14, will cause an additional lifting force to be exerted against the device 12.

The kinetic energy developed by the flowing liquid, will of course depend on its velocity, and not on its pressure, in passing through the device 12 and reversing under the overhanging flange 14, and hence the distance to which the device is moved outwardly against the tension of spring 17, will depend entirely on the rapidity of flow.

Therefore since the rapidity of flow is determined by the effective area of the inlet ports 11 and 20 through which the liquid is admitted to the interior of device 12, and since the area of the ports is cut down by a lifting of the device 12 through an increase speed of flow, it follows that with a certain setting of the device and certain original proportions of the various passageways and parts, that a constant outlet flow will take place from pipe 5' within a great difference in range of pressure admitted through pipe 4'.

The speed of the flowing water in the direction of outlet in the chamber 7, will be necessarily proportional to the volume of water passing this point. The push of the liquid against the actuating flange 14 of the tubular or sleeve valve device 12, together with the frictional effort exerted by the flow of the water through the restricted hole 16, will be nearly in proportion to the speed of the flowing liquid and is opposed only by the weight of the device 12 plus the effort of the adjusting spring 17. The weight of the device 12 being very light in proportion to the tractive effort of the flowing water, becomes almost negligible, thus allowing the operation of the mechanism at any desired angle.

With the device as described set for a discharge of three gallons per minute out of its outlet end and placed in a pipe line wherein the delivery pressure could be varied from fifty to several hundred pounds per square inch, and with variations of back pressure or heads on the outlet pipe 5' running from six inches to one hundred feet in height, the outlet flow was held substantially at three gallons per minute from any faucet at any point of elevation opened sufficiently or greatly in excess of that necessary to accommodate a three gallon per minute flow throughout the range of pressures and heads involved. Also, if three faucets were opened at once there was but one gallon per minute flow from each, and this notwithstanding the fact that when the faucets were closed the actual static pressure in the pipe just back of the faucets was equal to that in the delivery pipe 4'.

Having thus described my invention and shown wherein it differs from a mere pressure regulator, which of course would pass any amount of liquid through the pipe if all the faucets were opened in the experiment above given, it will be seen that I have provided a simple mechanism which will control the flow of a fluid such as liquids or gases through means of a factor derived from the flow of the fluid sought to be controlled.

I claim:

1. A fluid flow control device adapted to pass a liquid therethrough comprising a chambered body, a partition formed within the body dividing it into two chambers one of the chambers being provided with an inlet and the other provided with an outlet the inlet and outlet being of substantially equal cross section area, a passage formed in the partition communicating between said chambers and a movable device fitted within said passage provided with ports of equal effective area to the inlet arranged to unrestrictedly pass a volume of liquid equal to the volume entering the inlet at a predetermined minimum dynamic pressure, said device adapted to restrict the flow of liquid passing therethrough upon an increase in the minimum predetermined dynamic pressure whereby the volume delivered to the outlet chamber will remain constant.

2. A chambered body adapted for inserting in a pipe line to form a continuation thereof for flow of a liquid therethrough, a cylindrical shell mounted for piston-like movement within the chamber and ported to pass the liquid therethrough, said shell being arranged for movement by dynamic pressure of the fluid therepast in a manner to reduce the effective area of the porting to reduce the flow upon such movement, said shell having a cap at the remote end thereof with respect to the direction of flow for diverting the flowing liquid around the outer edge thereof and forming a reactance to the flow, said cap being spaced from said chamber around the sides to provide a space for the passage of the liquid, having an area not less than the area of the pipe.

3. A fluid flow control device comprising a body with a cylindrical chamber therein provided with an extension chamber portion of reduced diameter ported to an outer chamber, a fluid inlet port to the outer chamber and a fluid outlet port to said cylindrical chamber, a cylindrical shell slidably mounted in said extension chamber ported to receive fluid from the porting of the extension and ported to discharge to said cylindrical chamber, and means carried by said shell adapted to be influenced by the dynamic pressure of the fluid for sliding the shell, the porting of the shell being so arranged as to be reduced in effective area upon sliding movement of the shell, said means carried by the shell comprising a cap at the remote end of said shell with respect to direction of flow arranged to provide a reactance to the fluid, said cap overhanging the shell within the said cylindrical chamber, and spaced around the edge thereof from the sides of the cylindrical chamber to provide a space for the passage of the liquid of an area not less than the pipe area.

4. A chambered body adapted for inserting in a pipe line to form a continuation thereof for flow of a liquid therethrough, a cylindrical shell mounted for piston-like movement within the chamber and ported to pass the liquid therethrough, said shell having a cap at one end diverting the flowing fluid around the outer edge thereof and forming a reactance to the flow, said cap being spaced from said chamber around the sides to provide a space for the passage of the liquid, having an area not less than the pipe area, and said cap being pierced by a relatively small relief aperture.

OTTO W. HAHN.